US011728715B2

(12) United States Patent
Tangudu (10) Patent No.: US 11,728,715 B2
(45) Date of Patent: Aug. 15, 2023

(54) ELECTRIC MOTOR WITH SIMPLIFIED WINDING AND DUAL ROTOR

(71) Applicant: Hamilton Sundstrand Corporation, Charlotte, NC (US)

(72) Inventor: Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 135 days.

(21) Appl. No.: 17/223,303

(22) Filed: Apr. 6, 2021

(65) Prior Publication Data

US 2022/0320979 A1   Oct. 6, 2022

(51) Int. Cl.
*H02K 16/02* (2006.01)
*H02K 1/20* (2006.01)
*H02K 1/278* (2022.01)
*H02K 1/2786* (2022.01)
*H02K 3/28* (2006.01)

(52) U.S. Cl.
CPC .............. *H02K 16/02* (2013.01); *H02K 1/20* (2013.01); *H02K 1/278* (2013.01); *H02K 1/2786* (2013.01); *H02K 3/28* (2013.01)

(58) Field of Classification Search
CPC ............ H02K 16/02; H02K 3/28; H02K 3/34; H02K 3/345; H02K 15/02; H02K 15/026; H02K 1/20; H02K 1/278; H02K 1/2786; H02K 21/12; H02K 3/12; H02K 3/46; H02K 1/2783; H02K 1/2792; H02K 2201/06; H02K 21/16; H02K 21/22; H02K 1/02
USPC .............. 310/214, 215, 114, 154.33, 156.37
See application file for complete search history.

(56) References Cited

U.S. PATENT DOCUMENTS

| 4,731,554 A | 3/1988 | Hall et al. |
| 6,936,948 B2 | 8/2005 | Bell et al. |
| 7,525,230 B1 | 4/2009 | Gabrys |
| 8,217,544 B2 | 7/2012 | Osada et al. |
| 9,397,543 B2 | 7/2016 | Mountain et al. |
| 2012/0212085 A1* | 8/2012 | Fu ......................... H02K 21/24 310/58 |

(Continued)

FOREIGN PATENT DOCUMENTS

| CN | 111082622 A | * | 4/2020 |
| DE | 29702117 U1 | | 6/1998 |
| EP | 3355446 A1 | | 8/2018 |

OTHER PUBLICATIONS

Machine Translation of CN 111082622 A (Year: 2020).*

(Continued)

*Primary Examiner* — Alexander A Singh
(74) *Attorney, Agent, or Firm* — Cantor Colburn LLP (57) ABSTRACT

An electric motor is provided and includes inner and outer rotors, a stator supportive of back iron radially interposed between the inner and outer rotors and a winding structure. The winding structure includes first phase coils radially interposed between the inner rotor and a first side of the back iron, the first phase coils extending axially along the first side of the back iron, second phase coils radially interposed between a second side of the back iron and the outer rotor, the second phase coils extending axially along the second side of the back iron and end windings respectively extending radially between corresponding ones of the first and second phase coils.

17 Claims, 4 Drawing Sheets

(56) References Cited

U.S. PATENT DOCUMENTS

| | | | |
|---|---|---|---|
| 2016/0111927 A1* | 4/2016 | Jung | H02K 1/2773 310/156.14 |
| 2016/0126794 A1* | 5/2016 | Gery | H02K 1/278 310/156.01 |
| 2016/0156233 A1* | 6/2016 | Yoon | H02K 1/2786 310/43 |
| 2020/0227988 A1 | 7/2020 | Zhu et al. | |
| 2020/0395878 A1* | 12/2020 | Takahashi | H02K 1/2786 |
| 2022/0069685 A1* | 3/2022 | Mao | H02K 16/02 |

OTHER PUBLICATIONS

Search Report issued in European Patent Application No. 22162305.1; Application Filing Date Mar. 15, 2022; dated Sep. 9, 2022 (8 pages).

\* cited by examiner

ELECTRIC MOTOR WITH SIMPLIFIED WINDING AND DUAL ROTOR

BACKGROUND

The present disclosure relates to a motor drive and, in particular, to an electric motor with a simplified winding and a dual rotor.

Typically, electrical machines have coils made with two torque producing sides and two non-torque producing sides. These are often referred to as end windings. Two torque producing sides are placed in the main length of the stator and have currents applied thereto in order to interact with magnetic fields produced by a rotor including torque producing permanent magnets. The end windings provide paths for the current to flow and to maintain continuity.

BRIEF DESCRIPTION

According to an aspect of the disclosure, an electric motor is provided and includes inner and outer rotors, a stator supportive of back iron radially interposed between the inner and outer rotors and a winding structure. The winding structure includes first phase coils radially interposed between the inner rotor and a first side of the back iron, the first phase coils extending axially along the first side of the back iron, second phase coils radially interposed between a second side of the back iron and the outer rotor, the second phase coils extending axially along the second side of the back iron and end windings respectively extending radially between corresponding ones of the first and second phase coils.

In accordance with additional or alternative embodiments, the winding structure generates a decoupled flux pattern between respective flux patterns of the inner and outer rotors when current is applied to the first and second phase coils and the end windings.

In accordance with additional or alternative embodiments, the circumferentially arranged magnets of the inner and outer rotors are arranged in a Halbach array.

In accordance with additional or alternative embodiments, at least one of the inner rotor is circumferentially shifted with respect to the outer rotor and the first phase coils are circumferentially shifted with respect to the second phase coils.

In accordance with additional or alternative embodiments, the stator is formed to define axially extending cooling channels and the stator includes an axially extending member with a soft magnetic composite (SMC) tip disposed between the first and second phase coils.

In accordance with additional or alternative embodiments, the inner and outer rotors each have at least one or more of a same or a different one of a surface permanent magnet (SPM) formation, an internal permanent magnet (IPM) formation and a spoke formation.

In accordance with additional or alternative embodiments, the first and second phase coils are each provided with three phases, an odd number of phases greater than three or a multiple of three phases.

According to an aspect of the disclosure, an electric motor is provided and includes an inner rotor including circumferentially arranged magnets, an outer rotor including circumferentially arranged magnets and a stator supportive of back iron radially interposed between the inner and outer rotors and a winding structure. The winding structure includes first phase coils radially interposed between the inner rotor and a first side of the back iron, the first phase coils extending axially along the first side of the back iron, second phase coils radially interposed between a second side of the back iron and the outer rotor, the second phase coils extending axially along the second side of the back iron and end windings respectively extending radially between corresponding ones of the first and second phase coils.

In accordance with additional or alternative embodiments, the winding structure generates a decoupled flux pattern between respective flux patterns of the inner and outer rotors when current is applied to the first and second phase coils and the end windings.

In accordance with additional or alternative embodiments, the circumferentially arranged magnets of the inner and outer rotors are arranged in a Halbach array.

In accordance with additional or alternative embodiments, at least one of the inner rotor is circumferentially shifted with respect to the outer rotor and the first phase coils are circumferentially shifted with respect to the second phase coils.

In accordance with additional or alternative embodiments, the stator is formed to define axially extending cooling channels and the stator includes an axially extending member with a soft magnetic composite (SMC) tip disposed between the first and second phase coils.

In accordance with additional or alternative embodiments, the inner and outer rotors each have at least one or more of a same or a different one of a surface permanent magnet (SPM) formation, an internal permanent magnet (IPM) formation and a spoke formation.

In accordance with additional or alternative embodiments, the first and second phase coils are each provided with three phases, an odd number of phases greater than three or a multiple of three phases.

According to another aspect of the disclosure, an electric motor is provided and includes an inner rotor including circumferentially arranged magnets, an outer rotor including circumferentially arranged magnets and a stator supportive of back iron radially interposed between the inner and outer rotors and a winding structure. The winding structure includes first phase coils radially interposed between the inner rotor and a first side of the back iron, the first phase coils extending axially along the first side of the back iron, first insulators circumferentially interleaved with the first phase coils, second phase coils radially interposed between a second side of the back iron and the outer rotor, the second phase coils extending axially along the second side of the back iron, second insulators circumferentially interleaved with the second phase coils and end windings respectively extending radially between corresponding ones of the first and second phase coils.

In accordance with additional or alternative embodiments, the winding structure generates a decoupled flux pattern between respective flux patterns of the inner and outer rotors when current is applied to the first and second phase coils and the end windings.

In accordance with additional or alternative embodiments, the circumferentially arranged magnets of the inner and outer rotors are arranged in a Halbach array.

In accordance with additional or alternative embodiments, at least one of the inner rotor is circumferentially shifted with respect to the outer rotor and the first phase coils are circumferentially shifted with respect to the second phase coils.

In accordance with additional or alternative embodiments, the stator is formed to define axially extending cooling channels and the stator includes an axially extending member with a soft magnetic composite (SMC) tip disposed between the first and second phase coils.

In accordance with additional or alternative embodiments, the inner and outer rotors each have at least one or more of a same or a different one of a surface permanent magnet (SPM) formation, an internal permanent magnet (IPM) formation and a spoke formation.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, an electric motor is provided and has a simplified winding scheme with end windings disposed around back iron to reduce end winding length but still take advantage of distributed winding architecture. That is, the simplified winding scheme is characterized in that it exhibits a high fill factor and provides for higher torque than otherwise available. The electric motor can be provided with a dual rotor configuration (i.e., a Halbach array) and takes advantage of torque producing coils for producing torque and to allow for effective utilization of the windings.

Figure 1A:
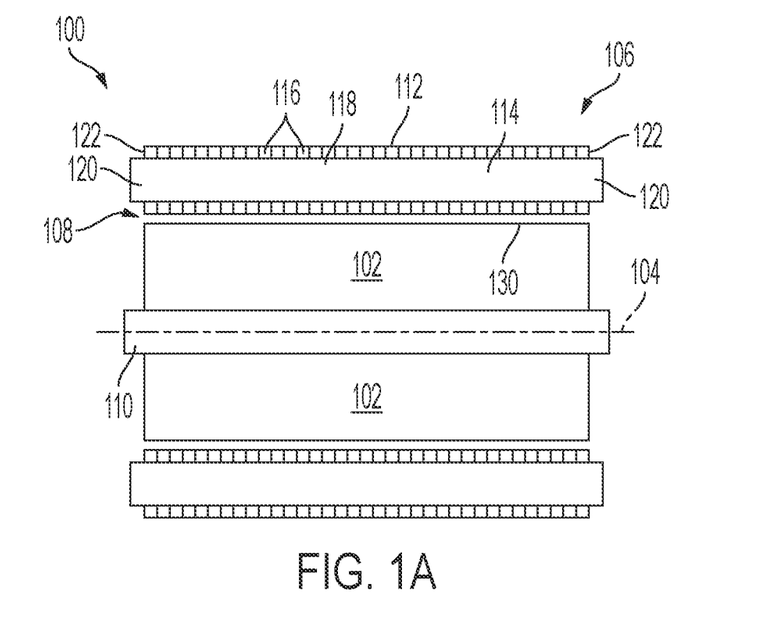
FIG. 1A is a partial view of an embodiment of electric motor.
Figure 1B:
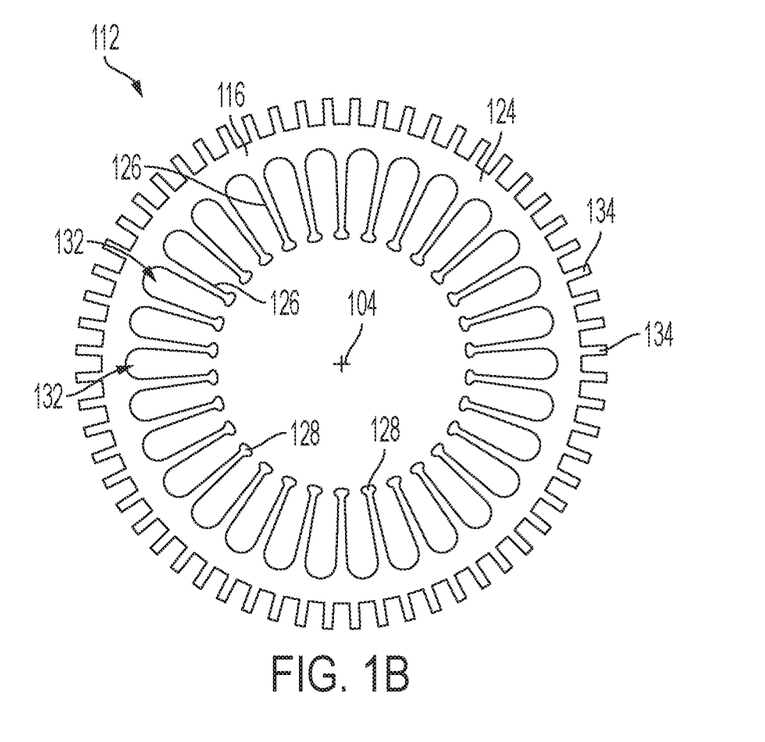
FIG. 1B is a cross-sectional view of an embodiment of a stator core of the electric motor of FIG. 1A.

With reference to FIGS. 1A and 1B, an electric motor 100 is provided and includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as the embodiment shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104.

Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A and 1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) often results in a TMS having a high weight to accommodate such loads. This can result in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2:
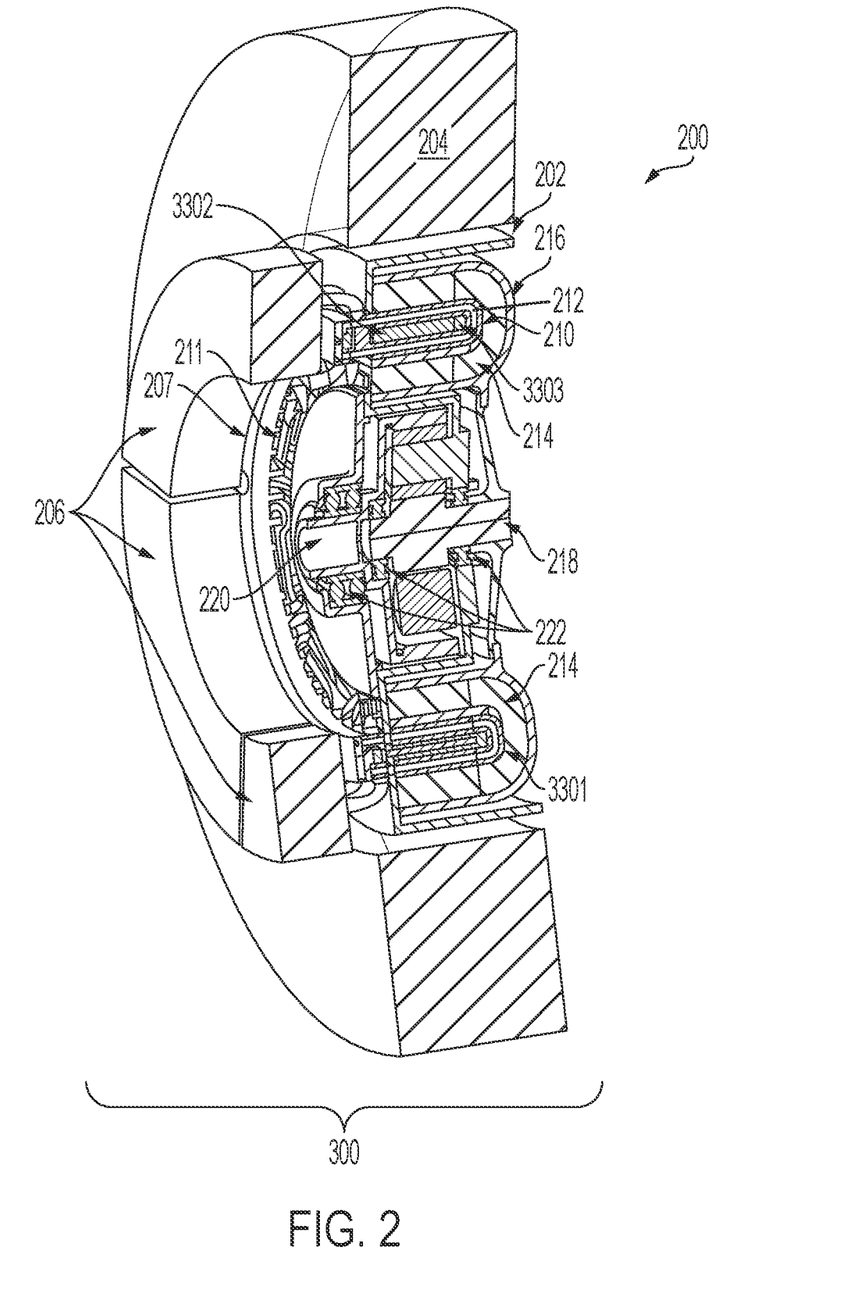
FIG. 2 is a cutaway perspective view of an aircraft electric motor in accordance with embodiments.

Turning now to FIG. 2, an aircraft electric motor 200 is provided and includes a motor housing 202, a condenser 204 and a power module system 206, which is separated from the motor housing 202 by plenum 207. The motor housing 202 houses a stator 210 and a rotor 212, with the rotor 212 configured to be rotatable about the stator 210. The rotor 212 includes a U-shaped magnet 214 that is arranged within a similarly shaped U-shaped rotor sleeve 216. The rotor sleeve 216 is operably connected to a hub 218, which is fixedly attached to a shaft 220. The shaft 220 is supported by bearings 222. The condenser 204 is configured to provide cooling to the components of the aircraft electric motor 200 and can include a heat exchanger and a header forming a closed-loop cooling system that provides air-cooling to a working fluid at the heat exchanger. As the aircraft electric motor 200 is operated, heat is generated and picked up by the working fluid within embedded cooling channels. The resulting heated working fluid is then passed through the header and back to the heat exchanger to be cooled, such as by air cooling. As shown, the condenser 204 may be a circular structure arranged about the motor housing 202. This configuration and arrangement allows for improved compactness of the system, which may be advantageous for aircraft applications. The rotor sleeve 216 with the magnets 214, the stator 210 and the gear assembly fit together (although moveable relative to each other) within the motor housing 202, providing for a compact (low volume/size) design.

The power module system 206 includes capacitors and other electronics, including, but not limited to, printed circuit boards (PCBs) that may enable control and operation of the aircraft electric motor 200. In general, the power module system 206 is electrically connected to the stator 210 to cause an electric current therein which will induce an electromagnetic field which will cause the rotor 212 to rotate. More particularly, the stator 210 includes windings 211 to which the power module 206 is attached and the power module 206 thus causes the electric current to be applied to the windings 211. The current in the windings 211 induces the electromagnetic field to drive the rotor 212 rotations.

With continued reference to FIG. 2, an integrated motor drive architecture can be provided and includes an electric motor, such as the aircraft electric motor 200 and the power module system 206 described above. In these or other cases, the power module system 206 can be integrated with and can be adjacent to the aircraft electric motor 200 with plenum 207 (see FIG. 2) axially interposed between the power module system 206 and the aircraft electric motor 200.

Figure 3:
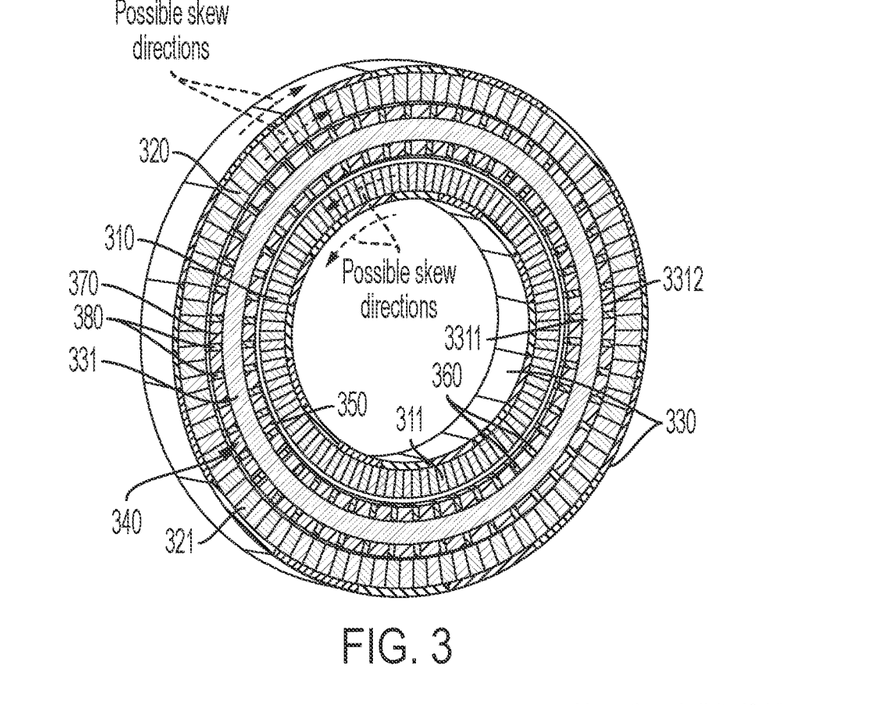
FIG. 3 is a perspective view of components of an electric motor in accordance with embodiments.
Figure 4:
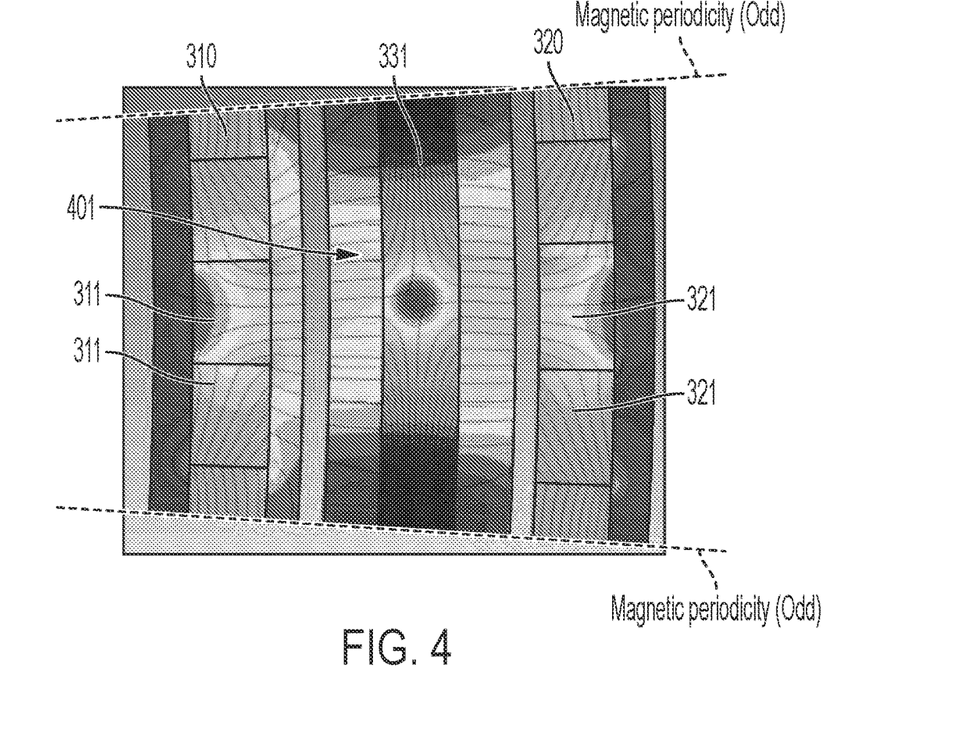
FIG. 4 is a plan view of flux lines of the electric motor of FIG. 3 in accordance with embodiments.
Figure 5:
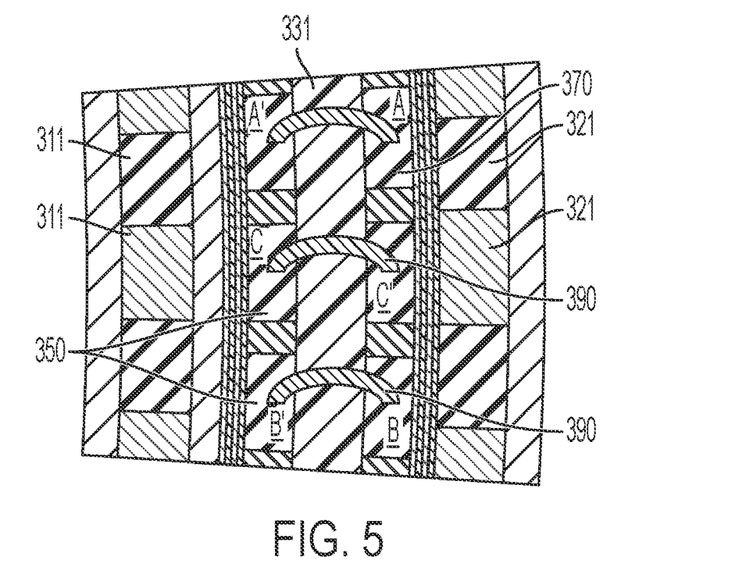
FIG. 5 is a plan view of end windings of the electric motor in accordance with embodiments.

With reference to FIGS. 3-5, an electric motor 300 is provided for use as an aircraft electric motor but is modified from the aircraft electric motor 200 of FIG. 2.

As shown in FIG. 3, the electric motor 300 includes an inner rotor 310, an outer rotor 320 and a stator 330. The inner rotor 310 includes circumferentially arranged permanent magnets 311, which can be arranged in a Halbach array or other similar formations. The outer rotor 320 also includes circumferentially arranged permanent magnets 321, which can also be arranged in a Halbach array or other similar formations. The stator 330 is supportive of back iron 331, which is radially interposed between the inner rotor 310 and the outer rotor 320, and a winding structure 340. The winding structure 340 includes first phase coils 350, first insulators 360, second phase coils 370, second insulators 380 and end windings 390 (see FIG. 5).

In accordance with embodiments, the stator 330 can be formed to define axially and radially extending cooling channels 3301 (see FIG. 2). In additional or alternative embodiments, the stator 330 can include or be supportive of an axially extending member 3302 (see FIG. 2) with a soft magnetic composite (SMC) tip 3303 (see FIG. 2) disposed between the first and second phase coils 350 and 370. In accordance with embodiments, the axially extending member 3302 can be formed of laminates, SMC or some combinations thereof. Similarly, in accordance with additional or alternative embodiments, the SMC tip 3303 can be formed of SMC, laminates or some combinations thereof. In any case, it is to be understood that the presence of the SMC tip 3303 serves to generate torque at or proximate to the location at which the U-shaped magnet turns.

The first phase coils 350 are circumferentially arrayed and radially interposed between the inner rotor 310 and a first or interior side 3311 of the back iron 331. The first phase coils 350 extend axially along the first or interior side 3311 of the back iron 331. The first insulators 360 are circumferentially interleaved between neighboring pairs of the first phase coils 350. The second phase coils 370 are circumferentially arrayed and radially interposed between a second or exterior side 3312 of the back iron 331 and the outer rotor 320. The second phase coils 370 extend axially along the second or exterior side 3312 of the back iron 331. The second insulators 380 are circumferentially interleaved between neighboring pairs of the second phase coils 370.

The first and second phase coils 350 and 370 can each be provided with three phases, an odd number of phases greater than three or a multiple of three phases.

While FIG. 3 illustrates that the inner rotor 310 and the outer rotor 320 are generally circumferentially aligned, it is to be understood that this is not required and that other arrangements are possible. For example, as indicated by the dashed arc-arrows of FIG. 3, the inner rotor 310 and the outer rotor 320 can be circumferentially shifted with respect to one another. Similarly, as is also indicated by the dashed arc-arrows of FIG. 3, the first phase coils 350 can be circumferentially shifted with respect to the second phase coils 370.

In accordance with embodiments and as shown in FIG. 4, when the electric motor 300 is activated, the winding structure 340 can generate a decoupled flux pattern 401 between respective flux patterns of the inner rotor 310 and the outer rotor 320 (see, e.g., FIG. 4 illustrating that the flux lines of the inner rotor 310 not intersecting with the flux lines of the outer rotor 320) when current is applied to the first and second phase coils 350 and 370 and the end windings 390 (see FIG. 5).

As shown in FIG. 5, each of the end windings 390 respectively extend radially between a corresponding one of the first phase coils 350 and a corresponding one of the second phase coils 370. In cases in which the inner rotor 310 and the outer rotor 320 are generally aligned, the end windings 390 are oriented to be generally parallel with the radial dimension. Alternatively, in cases in which the inner rotor 310 and the outer rotor 320 are circumferentially shifted with respect to one another, the end windings 390 are oriented to be slightly angled with respect to the radial dimension so as to accommodate the shift.

Figure 6:
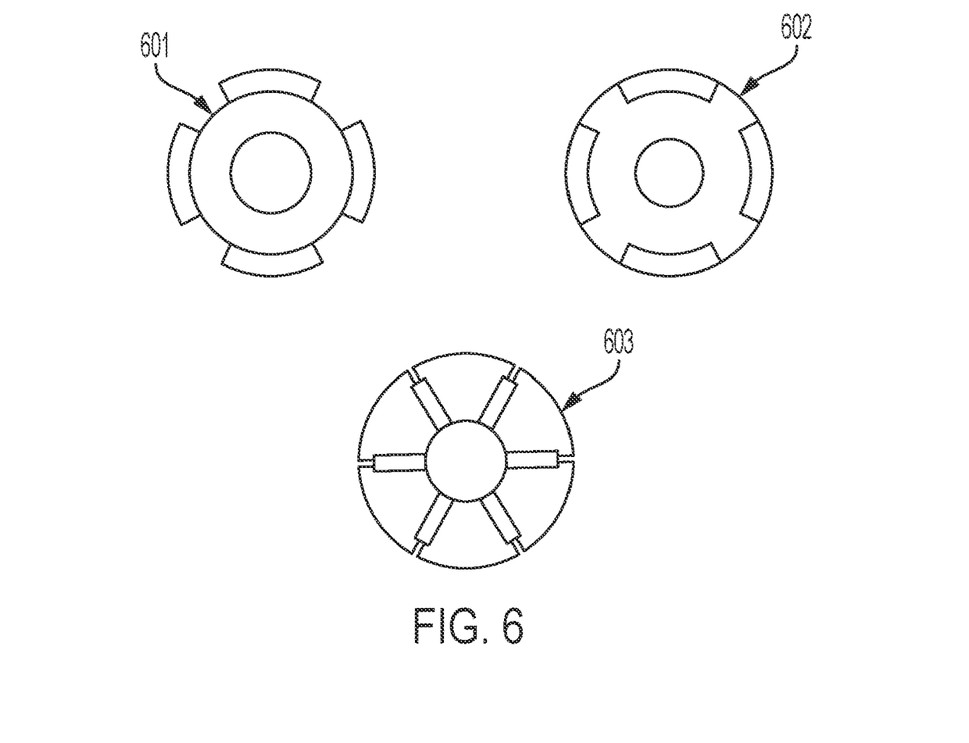
FIG. 6 are schematic illustrations of rotor configurations in accordance with embodiments.

With reference to FIG. 6 and in accordance with embodiments, the inner and outer rotors 310 and 320 of FIGS. 3-5 can each have at least one or more of a surface permanent magnet (SPM) formation 601, an internal permanent magnet (IPM) formation 602 and a spoke formation 603 as well as other variants. In accordance with embodiments, the formation of the inner and outer rotors 310 and 320 can be the same or different from one another.

Technical effects and benefits of the present disclosure are the provision an electric motor with a dual rotor configuration (i.e., a Halbach array) which can take advantage of torque producing coils for producing torque and to allow for effective utilization of the windings. This allows the electric motor to operate at increased torque density with reduced end winding size, weight and losses and with a simplified construction and an improved production rate.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An electric motor, comprising:
    inner and outer rotors; and
    a stator supportive of back iron comprising a first interior side and a second exterior side, which is opposite the first interior side, the back iron being radially interposed between the inner and outer rotors and a winding structure comprising:
        first insulators;
        first phase coils circumferentially interleaved with the first insulators and radially interposed with the first insulators between the inner rotor and the first interior side of the back iron, the first phase coils extending axially along the first interior side of the back iron;
        second insulators;
        second phase coils circumferentially interleaved with the second insulators and radially interposed with the second insulators between the second exterior side of the back iron and the outer rotor, the second phase coils extending axially along the second exterior side of the back iron; and
        end windings respectively extending radially between corresponding ones of the first and second phase coils,
    wherein the inner rotor is circumferentially aligned with respect to the outer rotor and the end windings are each provided as a single end winding oriented in parallel with a radial dimension between a corresponding one of the first phase coils and a corresponding one of the second phase coils.

2. The electric motor according to claim 1, wherein the winding structure generates a decoupled flux pattern between respective flux patterns of the inner and outer rotors when current is applied to the first and second phase coils and the end windings.

3. The electric motor according to claim 1, wherein circumferentially arranged magnets of the inner and outer rotors are arranged in a Halbach array.

4. The electric motor according to claim 1, wherein:
    the stator is formed to define axially extending cooling channels, and
    the stator comprises an axially extending member with a soft magnetic composite (SMC) tip disposed between the first and second phase coils.

5. The electric motor according to claim 1, wherein the inner and outer rotors each have a spoke formation.

6. The electric motor according to claim 1, wherein the first and second phase coils are each provided with three phases, an odd number of phases greater than three or a multiple of three phases.

7. An electric motor, comprising:
    an inner rotor comprising circumferentially arranged magnets;
    an outer rotor comprising circumferentially arranged magnets; and
    a stator supportive of back iron comprising a first interior side and a second exterior side, which is opposite the first interior side, the back iron being radially interposed between the inner and outer rotors and a winding structure comprising:
        first insulators;
        first phase coils circumferentially interleaved with the first insulators and radially interposed with the first insulators between the inner rotor and the first interior side of the back iron, the first phase coils extending axially along the first interior side of the back iron;
        second insulators;
        second phase coils circumferentially interleaved with the second insulators and radially interposed with the second insulators between the second exterior side of the back iron and the outer rotor, the second phase coils extending axially along the second exterior side of the back iron; and
        end windings respectively extending radially between corresponding ones of the first and second phase coils,
    wherein the inner rotor is circumferentially aligned with respect to the outer rotor and the end windings are each provided as a single end winding oriented in parallel with a radial dimension between a corresponding one of the first phase coils and a corresponding one of the second phase coils.

8. The electric motor according to claim 7, wherein the winding structure generates a decoupled flux pattern between respective flux patterns of the inner and outer rotors when current is applied to the first and second phase coils and the end windings.

9. The electric motor according to claim 7, wherein the circumferentially arranged magnets of the inner and outer rotors are arranged in a Halbach array.

10. The electric motor according to claim 7, wherein:
    the stator is formed to define axially extending cooling channels, and
    the stator comprises an axially extending member with a soft magnetic composite (SMC) tip disposed between the first and second phase coils.

11. The electric motor according to claim 7, wherein the inner and outer rotors each have a spoke formation.

12. The electric motor according to claim 7, wherein the first and second phase coils are each provided with three phases, an odd number of phases greater than three or a multiple of three phases.

13. An electric motor, comprising:
    an inner rotor comprising circumferentially arranged magnets;
    an outer rotor comprising circumferentially arranged magnets; and
    a stator supportive of back iron comprising a first interior side and a second exterior side, which is opposite the first interior side, the back iron being radially interposed between the inner and outer rotors and a winding structure comprising:

first phase coils radially interposed between the inner rotor and the first interior side of the back iron, the first phase coils extending axially along the first interior side of the back iron;
first insulators circumferentially interleaved with the first phase coils and radially interposed between the inner rotor and the first interior side of the back iron;
second phase coils radially interposed between the second exterior side of the back iron and the outer rotor, the second phase coils extending axially along the second exterior side of the back iron;
second insulators circumferentially interleaved with the second phase coils and radially interposed between the outer rotor and the second exterior side of the back iron; and
end windings respectively extending radially between corresponding ones of the first and second phase coils,
wherein the inner rotor is circumferentially aligned with respect to the outer rotor and the end windings are each provided as a single end winding oriented in parallel with a radial dimension between a corresponding one of the first phase coils and a corresponding one of the second phase coils.

14. The electric motor according to claim 13, wherein the winding structure generates a decoupled flux pattern between respective flux patterns of the inner and outer rotors when current is applied to the first and second phase coils and the end windings.

15. The electric motor according to claim 13, wherein the circumferentially arranged magnets of the inner and outer rotors are arranged in a Halbach array.

16. The electric motor according to claim 13, wherein:
the stator is formed to define axially extending cooling channels, and
the stator comprises an axially extending member with a soft magnetic composite (SMC) tip disposed between the first and second phase coils.

17. The electric motor according to claim 13, wherein the inner and outer rotors each have a spoke formation.

* * * * *